US012694802B2

(12) United States Patent
Zheng

(10) Patent No.: US 12,694,802 B2
(45) Date of Patent: Jul. 28, 2026

(54) GUIDE RAIL FOR INSTALLING ULTRA-THIN EPD ELECTRONIC SHELF LABEL

(71) Applicant: Hanshow Technology Co., Ltd., Jiaxing (CN)

(72) Inventor: Zongdi Zheng, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 115 days.

(21) Appl. No.: 18/682,319

(22) PCT Filed: Aug. 9, 2021

(86) PCT No.: PCT/CN2021/111439
§ 371 (c)(1),
(2) Date: Feb. 8, 2024

(87) PCT Pub. No.: WO2023/015405
PCT Pub. Date: Feb. 16, 2023

(65) Prior Publication Data

US 2024/0355235 A1 Oct. 24, 2024

(51) Int. Cl.
*G09F 3/20* (2006.01)
*A47F 5/00* (2006.01)

(52) U.S. Cl.
CPC ............ *G09F 3/204* (2013.01); *A47F 5/0068* (2013.01); *G09F 3/208* (2013.01)

(58) Field of Classification Search
CPC ............................... A47F 5/0068; G09F 3/208
(Continued)

(56) References Cited

U.S. PATENT DOCUMENTS 12,380,814 B2 * 8/2025 Rössl ...................... G09F 3/204
2002/0146282 A1 * 10/2002 Wilkes .................... G09F 3/204
403/331
(Continued)

FOREIGN PATENT DOCUMENTS

CN 205751360 U * 11/2016 ............. G09F 3/208
CN 208240270 U * 12/2018 ............. G09F 3/208
(Continued)

OTHER PUBLICATIONS

CN-208240270-U English Translation (Year: 2018).*
(Continued)

*Primary Examiner* — Kyle R Grabowski
(74) *Attorney, Agent, or Firm* — Hanley, Flight & Zimmerman, LLC

(57) ABSTRACT

A guide rail for installing an ultra-thin EPD electronic shelf label is provided and includes: upper and lower ends of a guide rail body are integrally connected to a snap elastic arm and an anti-disassembly-damage elastic arm, respectively; an upper snap is located on the snap elastic arm, and a lower snap is integrally connected to the anti-disassembly-damage elastic arm; the upper snap and the lower snap are used to clamp the electronic shelf label on the guide rail; the snap elastic arm and the anti-disassembly-damage elastic arm are used to provide elastic spaces for the upper snap and the lower snap; an anti-slip soft rubber is disposed on a side of the guide rail body where the electronic shelf label is installed; the mounting pendant is disposed on a side of the guide rail body facing away from the electronic shelf label.

19 Claims, 20 Drawing Sheets

(58) Field of Classification Search
USPC ................................................ 40/658, 661.03
See application file for complete search history.

(56) References Cited

U.S. PATENT DOCUMENTS

| | | | | |
|---|---|---|---|---|
| 2021/0343193 | A1* | 11/2021 | Mazzone | A47F 5/0869 |
| 2024/0395174 | A1* | 11/2024 | Herrnegger | G09F 3/204 |

FOREIGN PATENT DOCUMENTS

| | | | | | |
|---|---|---|---|---|---|
| CN | 209216433 | U | * | 8/2019 | G09F 3/208 |
| DE | 202021104616 | U1 | * | 9/2021 | A47F 5/0068 |
| DE | 202022101273 | U1 | * | 4/2022 | G09F 3/208 |
| EP | 0722158 | A1 | | 7/1996 | |
| FR | 2857143 | B1 | * | 10/2005 | |
| WO | WO-9832115 | A1 | * | 7/1998 | A47F 5/0068 |
| WO | WO-2011010003 | A1 | * | 1/2011 | G09F 3/208 |
| WO | WO-2021032278 | A1 | * | 2/2021 | G09F 3/208 |

OTHER PUBLICATIONS

International Searching Authority, "International Search Report," issued in connection with International Application No. PCT/CN2021/111439, dated Apr. 14, 2022, 6 pages.
International Searching Authority, "Written Opinion," issued in connection with International Application No. PCT/CN2021/111439, dated Apr. 14, 2022, 8 pages.
IP Australia, "Second Office Action," issued on Sep. 9, 2025, for counterpart Australian Patent Application No. 2021460075, 3 pages.
New Zealand Intellectual Property Office, "First Office Action," issued on Nov. 24, 2025, for New Zealand Patent Application No. 807998, 3 pages.
European Patent Office, "Extended European Search Report" issued on Apr. 11, 2025 for counterpart European patent application No. 21953044.1, 10 pages.
IP Australia, "Examination Report No. 1", issued in connection with AU Patent Application No. 2021460075 on Oct. 30, 2024, 3 pages.

* cited by examiner

GUIDE RAIL FOR INSTALLING ULTRA-THIN EPD ELECTRONIC SHELF LABEL

CROSS-REFERENCE TO RELATED APPLICATION

The present disclosure is a National Stage of International Application No. PCT/CN2021/111439, filed on Aug. 9, 2021.

TECHNICAL FIELD

The present disclosure relates to the technical field of electronic shelf labels, and particularly to a guide rail for installing an ultra-thin EPD (Electronic Paper Display) electronic shelf label.

BACKGROUND

This section is intended to provide a background or context for the embodiments of the present disclosure set forth in the claims. The description herein is not admitted as prior art by inclusion in this section.

As an innovative product, the ultra-thin electronic shelf label has an ultra-thin structural size and a unique installing structure, and needs to be fitted with a special guide rail to be mounted on a shelf. The guide rail can protect the electronic shelf label while the shelf label is installed on it. However, the traditional guide rail design (see FIG. 1) has the following disadvantages: ① the existing guide rail installing structure cannot fit the installing interface and size of the ultra-thin electronic shelf label, and thus cannot realize the function of installing the shelf label and the 'ultra-thin' effect; ② the existing guide rail has no anti-disassembly-damage elastic arm, and does not have the function of preventing the electronic shelf label from being damaged during a violent disassembly; ③ the existing guide rail is not designed with a disassembly guiding elastic arm, and it is inconvenient to disassemble the shelf label; and ④ some extended functions cannot be realized, such as installing a shelf-label protective cover and mounting a customer promotion card.

SUMMARY

Embodiments of the present disclosure provide a guide rail for installing an ultra-thin EPD electronic shelf label, including a guide rail body, an upper snap, a lower snap, an anti-slip soft rubber, a snap elastic arm, an anti-disassembly-damage elastic arm and a mounting pendant. Upper and lower ends of the guide rail body are integrally connected to the snap elastic arm and the anti-disassembly-damage elastic arm, respectively. The upper snap is located on the snap elastic arm, and the lower snap is integrally connected to the anti-disassembly-damage elastic arm. The upper snap and the lower snap are used to clamp the electronic shelf label on the guide rail after the electronic shelf is installed. The snap elastic arm and the anti-disassembly-damage elastic arm are used to provide elastic spaces for the upper snap and the lower snap, so that the installation of the electronic shelf label is convenient and reliable. The anti-disassembly-damage elastic arm is further used to prevent a wrong disassembly at the lower snap from damaging the electronic shelf label and the guide rail. The anti-slip soft rubber is disposed on a side of the guide rail body where the electronic shelf label is installed, and used to be extruded by a back side of the installed electronic shelf label, so as to ensure that a position of the electronic shelf label on the guide rail will not be easily changed. The mounting pendant is disposed on a side of the guide rail body facing away from the electronic shelf label, and used to enable the guide rail to be fixedly placed.

The guide rail for installing an ultra-thin EPD electronic shelf label proposed by the present disclosure can install and protect the electronic shelf label, while facilitating the installation and disassembly and preventing disassembly-damage. The anti-slip soft rubber generates a resistance to the sliding of the electronic shelf label on the guide rail, so as to ensure that the position of the electronic shelf label on the guide rail will not be easily changed.

BRIEF DESCRIPTION OF DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DESCRIPTION OF EMBODIMENTS

For a clearer understanding of the objectives, technical features and effects of the embodiments of the present disclosure, specific embodiments will now be described with reference to the drawings. The described embodiments are intended only to schematically illustrate and explain the present disclosure and do not limit the scope of the present disclosure.

Figure 1:
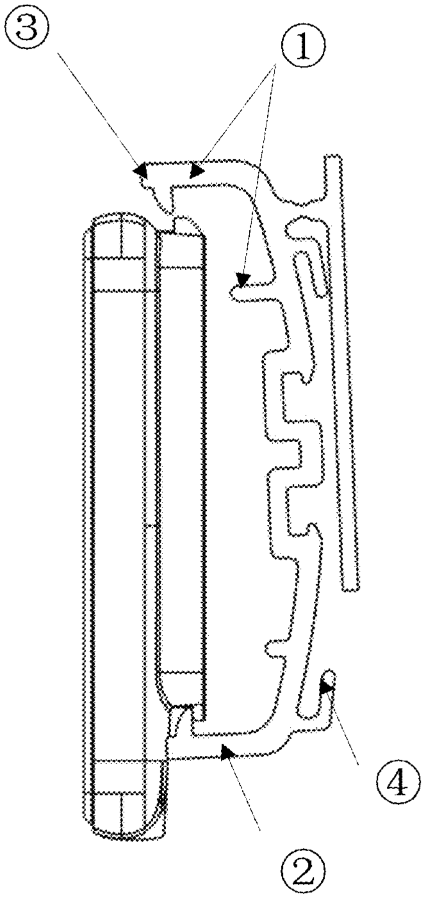
FIG. 1 illustrates a schematic diagram of a side-viewing structure of an existing guide rail installed with an electronic shelf label.
Figure 2:
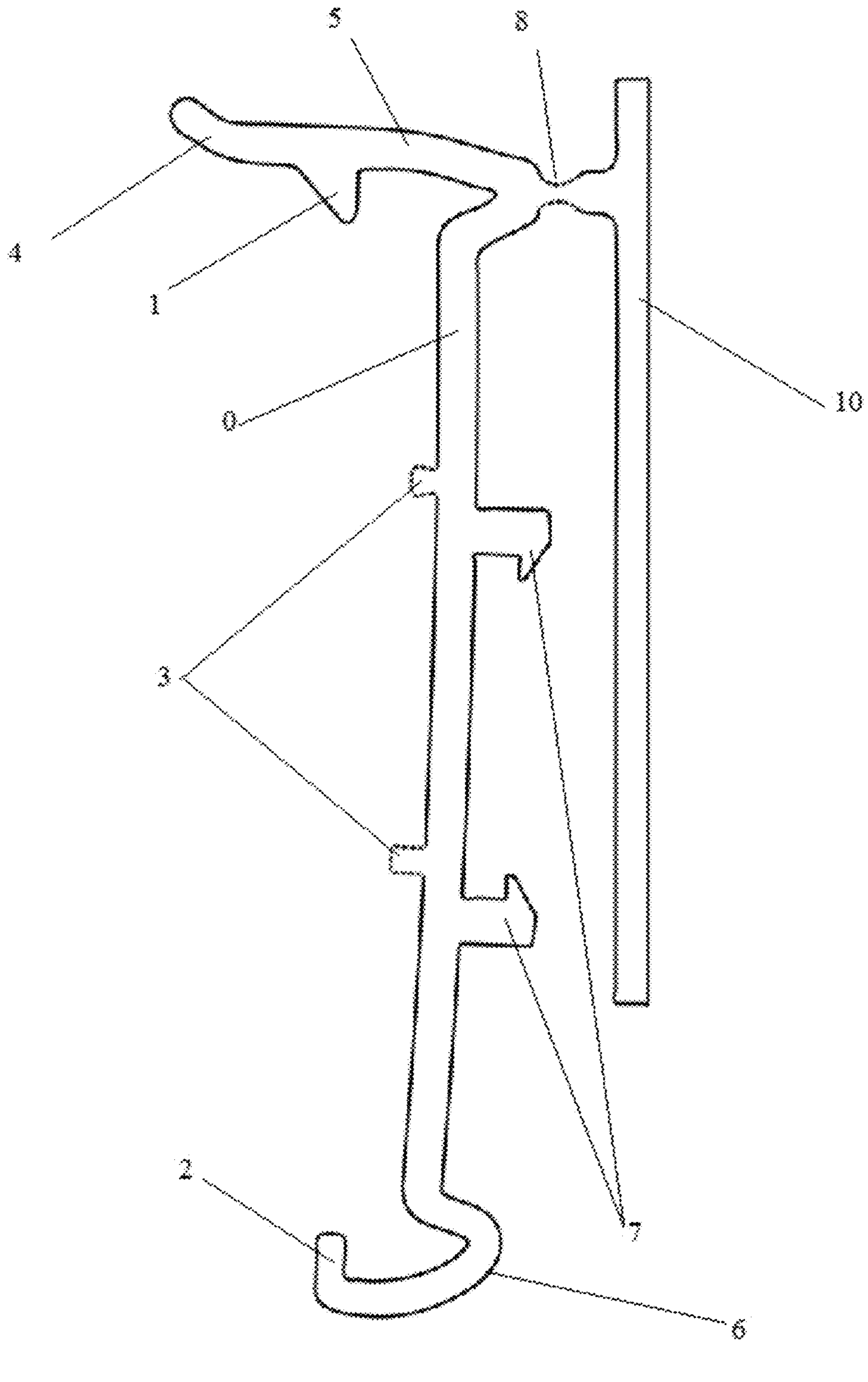
FIG. 2 illustrates a schematic diagram of a side-viewing structure of a guide rail for installing an ultra-thin EPD electronic shelf label according to an embodiment of the present disclosure.

FIG. 2 illustrates a schematic diagram of a side-viewing structure of a guide rail for installing an ultra-thin EPD electronic shelf label according to an embodiment of the present disclosure. As illustrated in FIG. 2, the guide rail for installing an ultra-thin EPD electronic shelf label includes a guide rail body 0, an upper snap 1, a lower snap 2, an anti-slip soft rubber 3, a snap elastic arm 5, an anti-disassembly-damage elastic arm 6 and a mounting pendant 10.

Upper and lower ends of the guide rail body 0 are integrally connected to the snap elastic arm 5 and the anti-disassembly-damage elastic arm 6, respectively. The upper snap 1 is located on the snap elastic arm 5, and the lower snap 2 is integrally connected to the anti-disassembly-damage elastic arm 6.

The upper snap 1 and the lower snap 2 are connectors for mounting and fixing the shelf label on the guide rail, and are used to clamp the electronic shelf label on the guide rail.

The snap elastic arm 5 and the anti-disassembly-damage elastic arm 6 are used to provide elastic spaces S1, S2 for the upper snap 1 and the lower snap 2 (as exemplarily illustrated in FIG. 5), so that a user can install and disassemble the electronic shelf label conveniently.

The anti-disassembly-damage elastic arm 6 is further used to prevent a wrong disassembly at the lower snap 2 from damaging the electronic shelf label and the guide rail, so as to solve the following technical problem in the prior art: ② the existing guide rail has no anti-disassembly-damage elastic arm, and does not have the function of preventing the electronic shelf label from being damaged during a violent disassembly.

The anti-slip soft rubber 3 is disposed on a side of the guide rail body 0 where the electronic shelf label is installed, with a function to generate slip damping when the soft rubber is extruded by a back side of the installed electronic shelf label, so as to ensure that the position of the electronic shelf label on the guide rail will not be easily changed. The value of the slip resistance may be adjusted through the height of the soft rubber, i.e., the greater the higher of the soft rubber, the greater the deformation of the soft rubber and the greater the slip resistance.

The mounting pendant 10 is disposed on a side of the guide rail body 0 facing away from the electronic shelf label, and used to fix the guide rail on a target shelf.

Figure 3:
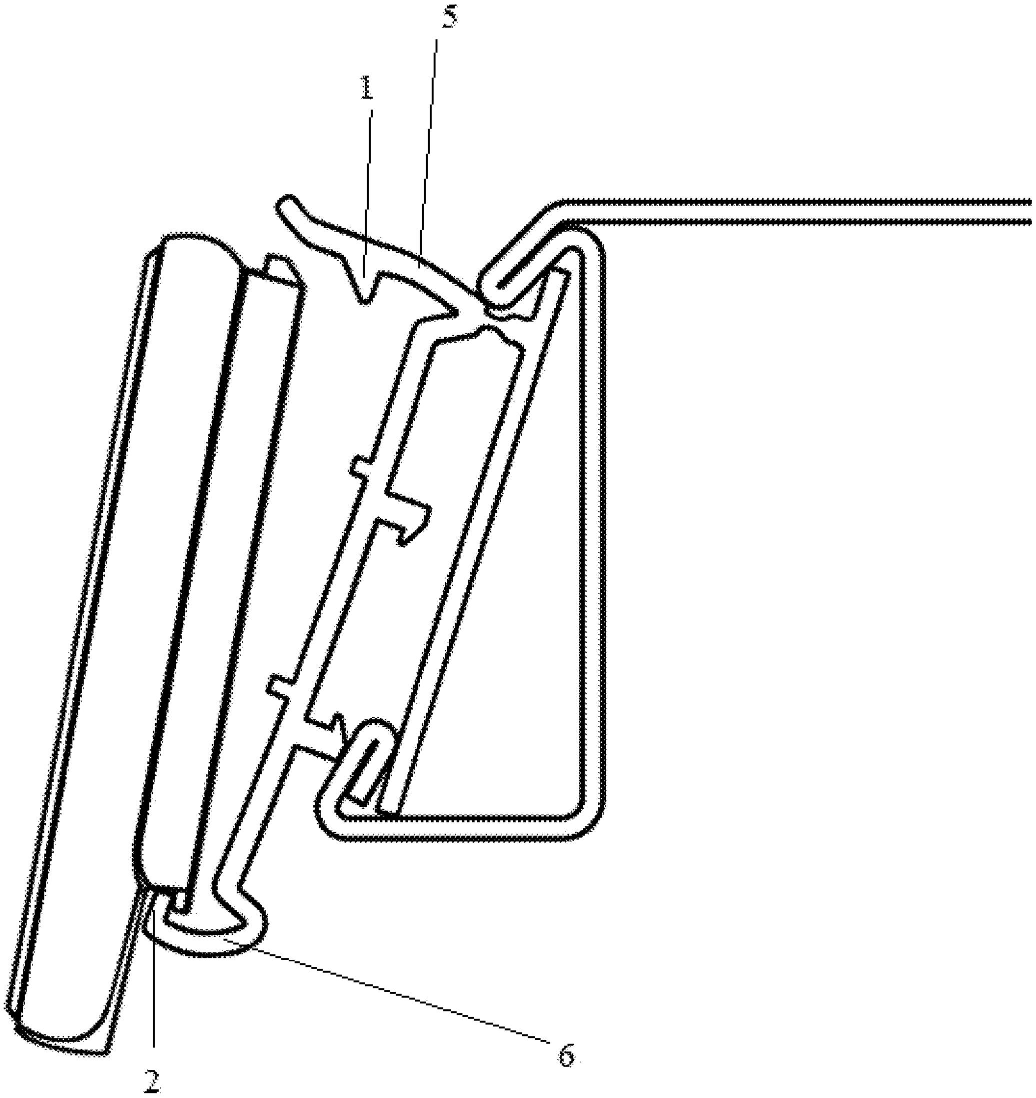
FIG. 3 illustrates a first schematic diagram of installation of an ultra-thin EPD electronic shelf label according to an embodiment of the present disclosure.
Figure 4:
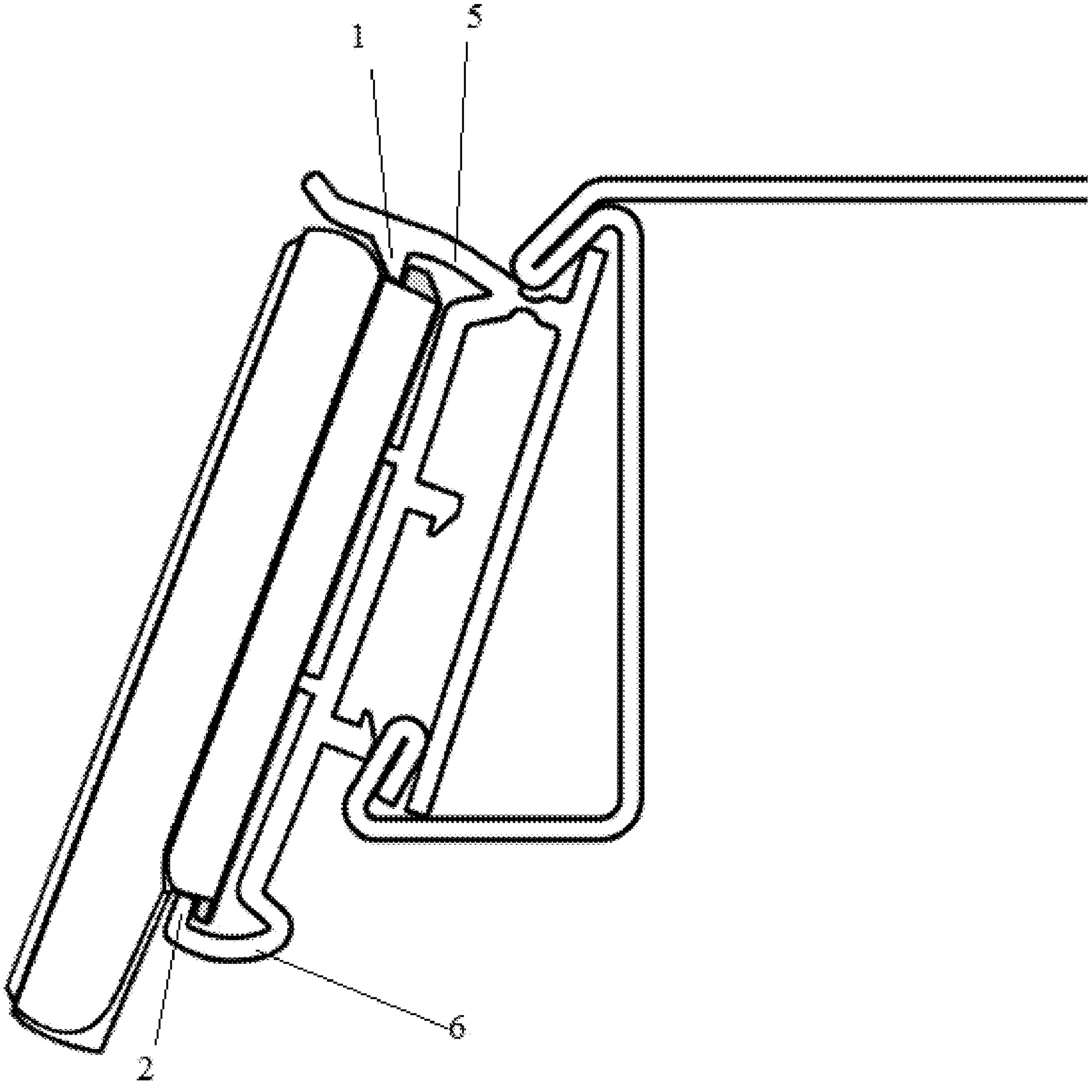
FIG. 4 illustrates a second schematic diagram of installation of an ultra-thin EPD electronic shelf label according to an embodiment of the present disclosure.

Specifically, the electronic shelf label is installed from the lower snap 2. Firstly, a lower clamping part of the shelf label is placed in the snap 2, and then a middle of an upper part of the shelf label is pushed until a ‘click’ sound is heard, indicating that an upper clamping part of the shelf label enters into the upper snap 1 and the installation is completed. The specific installation is illustrated in FIGS. 3 and 4. The shelf label is clamped in the guide rail by the upper snap 1 and the lower snap 2, and the snap elastic arm 5 and the anti-disassembly-damage elastic arm 6 provide sufficient elastic spaces for the upper snap 1 and the lower snap 2, so that the electronic shelf label can be installed conveniently and reliably, as illustrated in FIG. 5.

Specifically, after the electronic shelf label is installed in place, the anti-slip soft rubber 3 is extruded by the back side of the shelf label to deform and generate a slip resistance, so as to ensure that the position of the electronic shelf label on the guide rail will not be easily changed.

Figure 6:
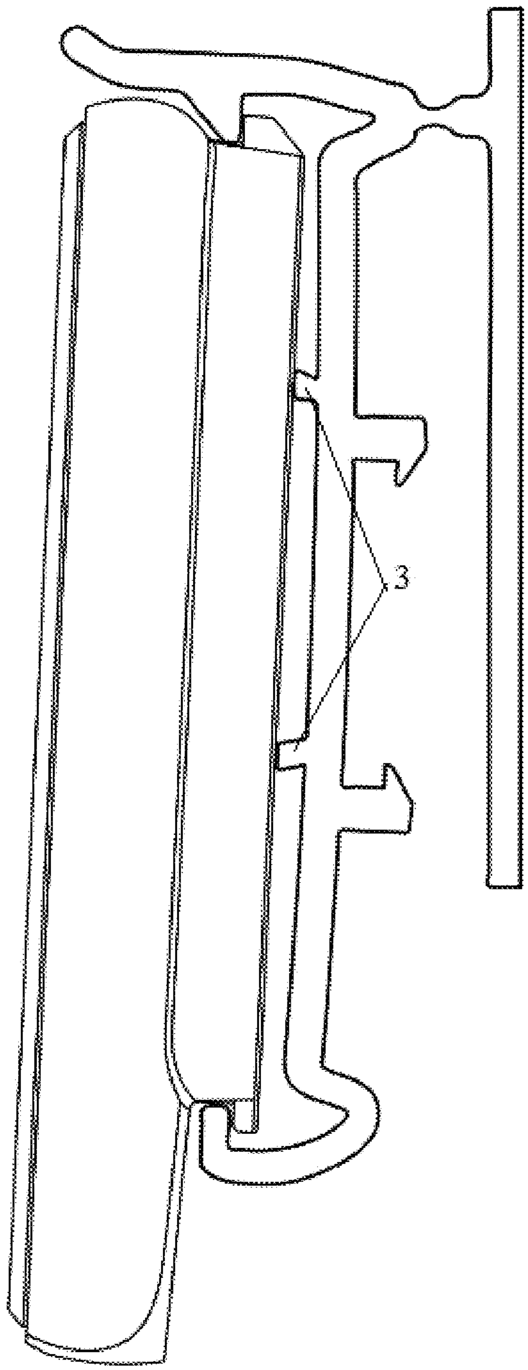
FIG. 6 illustrates a first schematic diagram of an anti-slip soft rubber according to an embodiment of the present disclosure.
Figure 7:
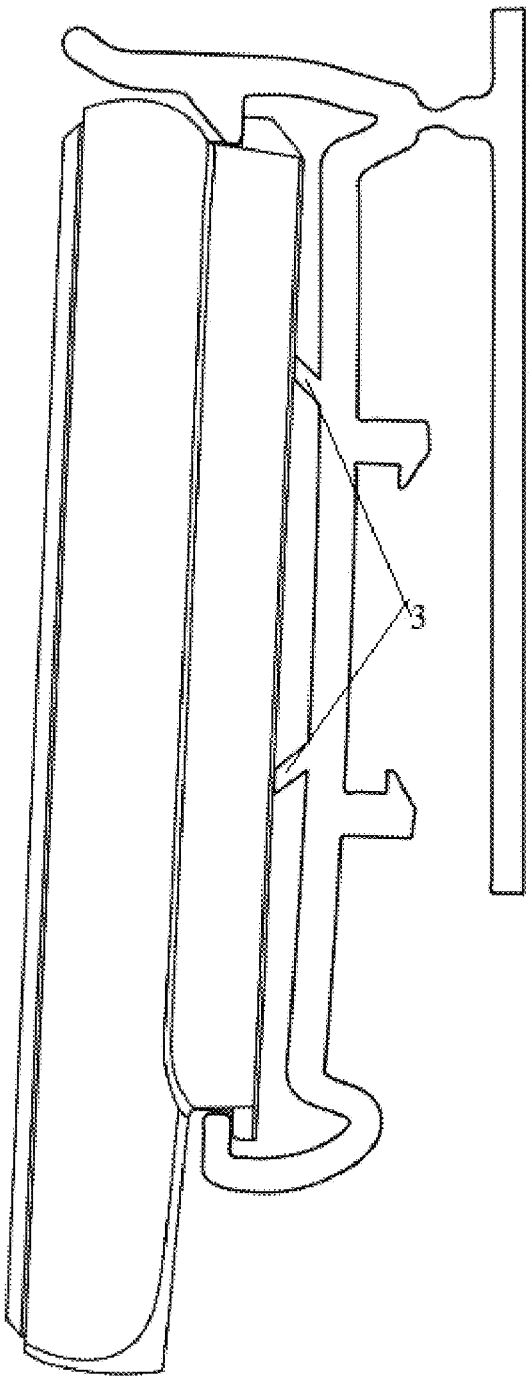
FIG. 7 illustrates a second schematic diagram of an anti-slip soft rubber according to an embodiment of the present disclosure.

In addition, it is possible to meet lateral thrust requirements of different customers by adjusting the height of the anti-slip soft rubber 3, such as a weak damping design (FIG. 6) which is convenient for freely adjusting the position of the shelf label and a strong damping design (FIG. 7) which prevents a customer from moving the shelf label.

Figure 5:
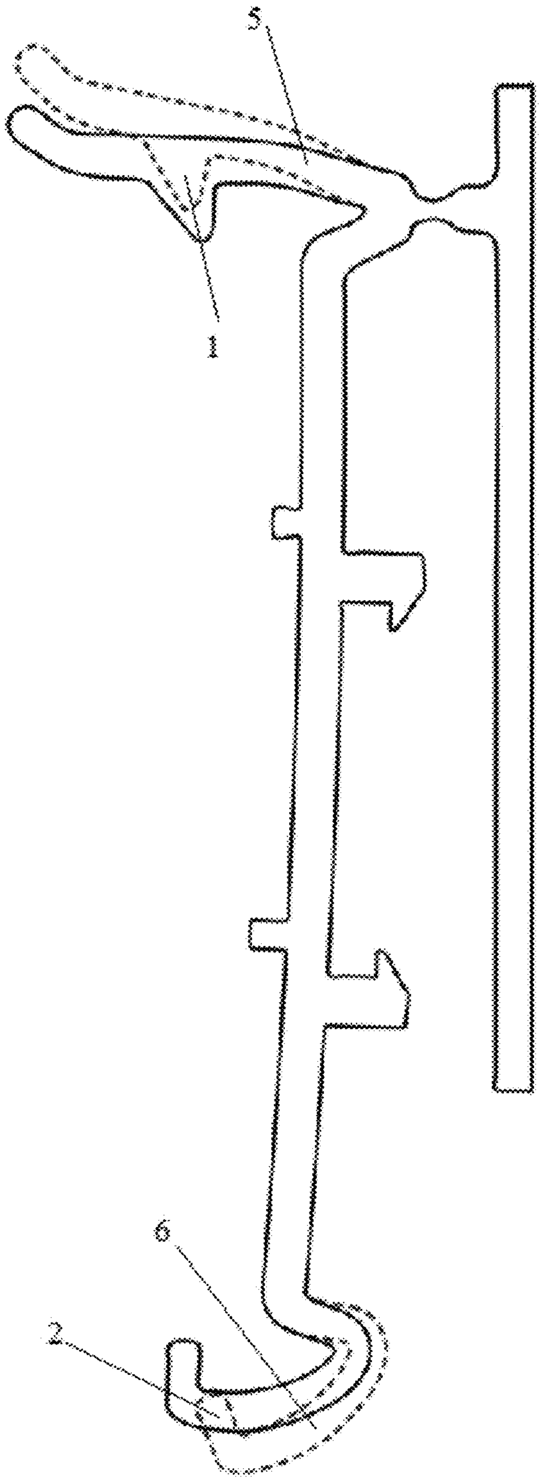
FIG. 5 illustrates a schematic diagram of a snap elastic arm and an anti-disassembly-damage elastic arm according to an embodiment of the present disclosure.

In an embodiment illustrated in FIGS. 2 and 5, an end of the snap elastic arm 5 that is connected to the guide rail body 0 is a V-shaped structure 51 with an opening 52 facing the upper snap 1, so as to provide an elastic space S1 for the upper snap 1. The V-shaped structure 51 of the snap elastic arm 5 is located between the guide rail body 0 and the mounting pendant 10.

In an embodiment illustrated in FIGS. 2 and 5, an end of the anti-disassembly-damage elastic arm 6 that is connected to the guide rail body 0 is a V-shaped structure 61 with an opening 62 facing the lower snap 2, so as to provide an elastic space S2 for the lower snap 2. The V-shaped structure 61 of the anti-disassembly-damage elastic arm 6 is located between the guide rail body 0 and the mounting pendant 10.

In an embodiment of the present disclosure, as illustrated in FIG. 2, a disassembly guiding arm 4 is further included. The disassembly guiding arm 4 is located at an end of the snap elastic arm 5 and used to guide the disassembly of the electronic shelf label from the guide rail, which can solve the following technical problem in the prior art: ③ the existing guide rail is not designed with a disassembly guiding elastic arm, and it is inconvenient to disassemble the shelf label.

Figure 8:
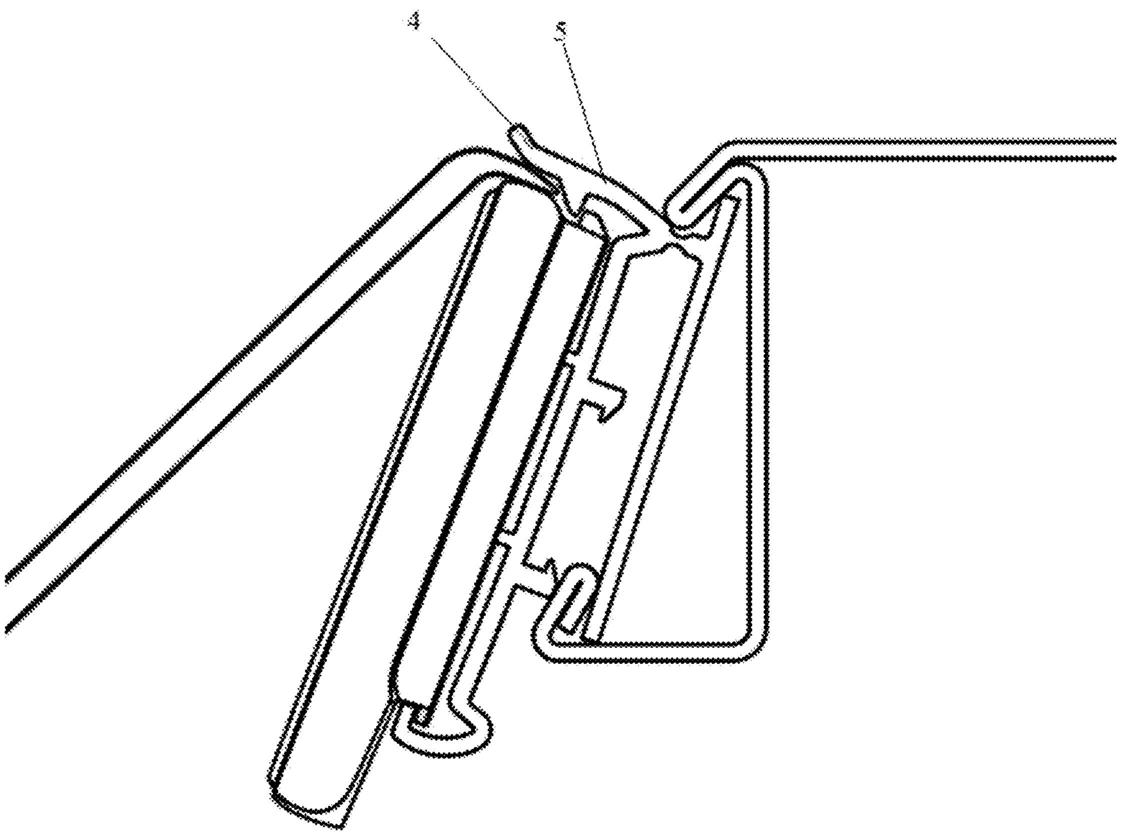
FIG. 8 illustrates a first schematic diagram of disassembly of an ultra-thin EPD electronic shelf label according to an embodiment of the present disclosure.
Figure 9:
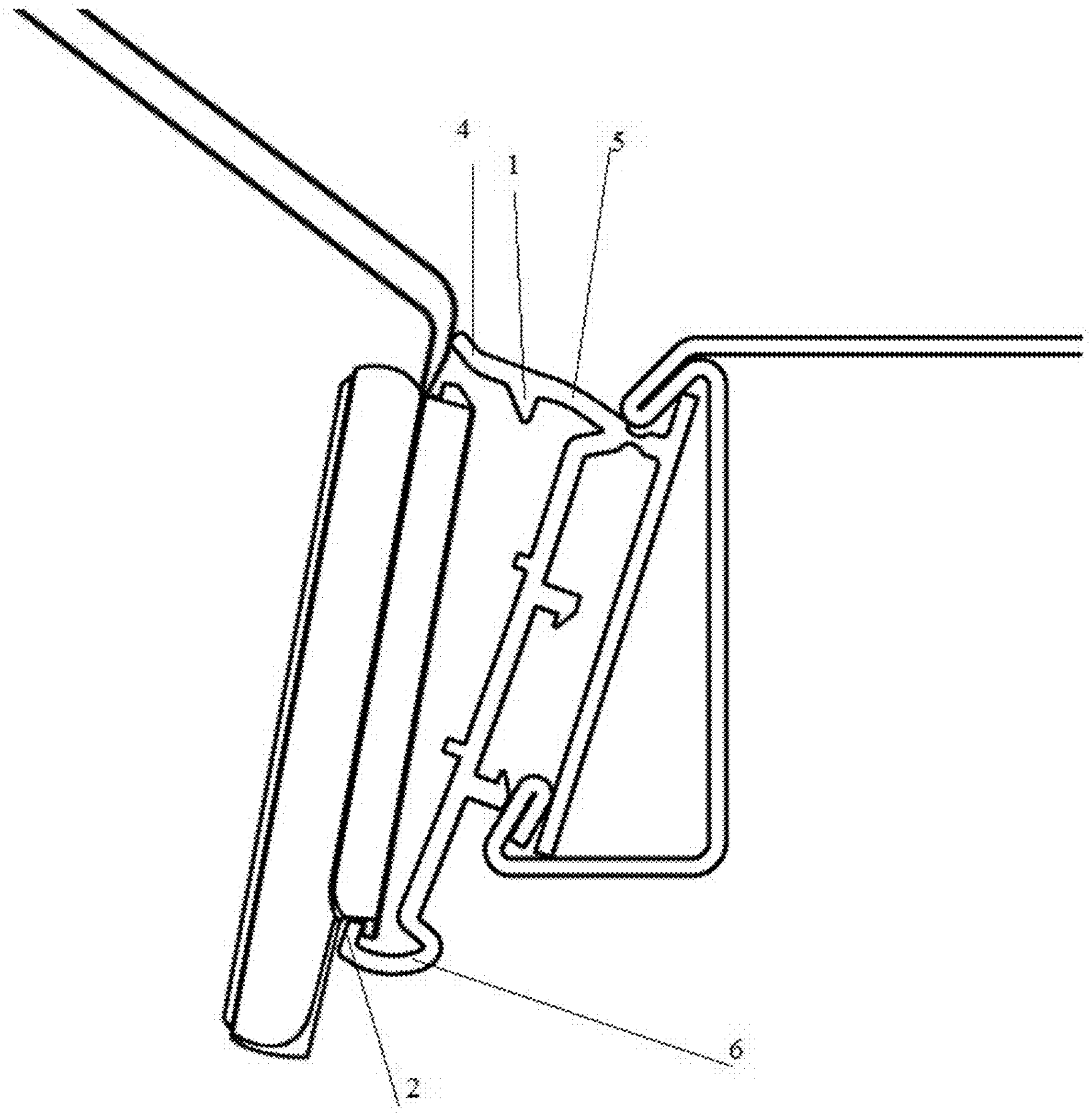
FIG. 9 illustrates a second schematic diagram of disassembly of an ultra-thin EPD electronic shelf label according to an embodiment of the present disclosure.

Specifically, a disassembly process is illustrated in FIGS. 8 and 9. When the electronic shelf label is disassembled, two claws at a front end of a driver for the electronic shelf label may be easily clamped into a gap between the guiding arm 4 and the shelf label and hooked on the top of the shelf label;

next, the guiding arm is pried upward with a contact point of the shelf label as a fulcrum to drive the upper snap 1 to lift away from the clamping part of the shelf label, thereby easily disassembling the electronic shelf label from the clamping groove of the guide rail. In order to avoid the damage to the electronic shelf label and the guide rail caused by mistakenly disassembling from the lower snap, the anti-disassembly-damage elastic arm 6 is provided to generate a sufficient elastic deformation during forced disassembly, so that the clamping part at the bottom of the shelf label can be detached from the lower snap 2 of the guide rail before being damaged, thereby eliminating the risk of damage to the electronic shelf label and the guide rail.

In an embodiment of the present disclosure, as illustrated in FIG. 2, a bendable soft rubber 8 is further included, through which the mounting pendant 10 is connected to the guide rail body 0, so that the guide rail body 0 mounted with the shelf label can be lifted up conveniently when needed.

In an embodiment of the present disclosure, as illustrated in FIG. 2, an angle block snap 7 is disposed on a side of the guide rail body 0 facing away from the electronic shelf label, and used to mount the angle block to set a lifting angle of the guide rail.

Figure 10:
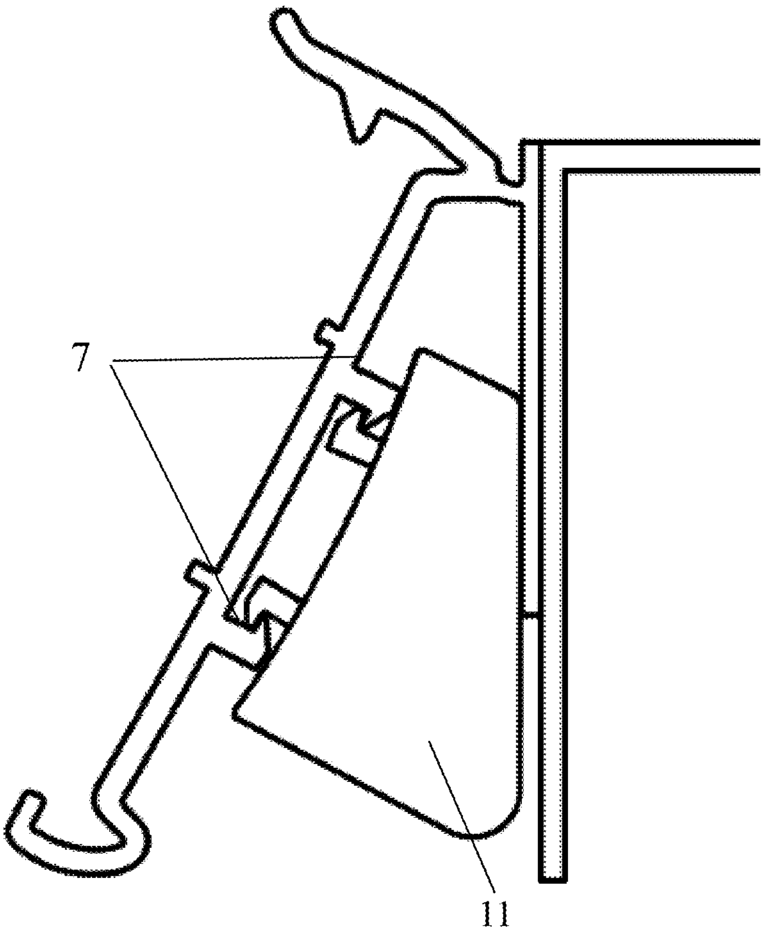
FIG. 10 illustrates a first schematic diagram of mounting of an angle block according to an embodiment of the present disclosure.
Figure 11:
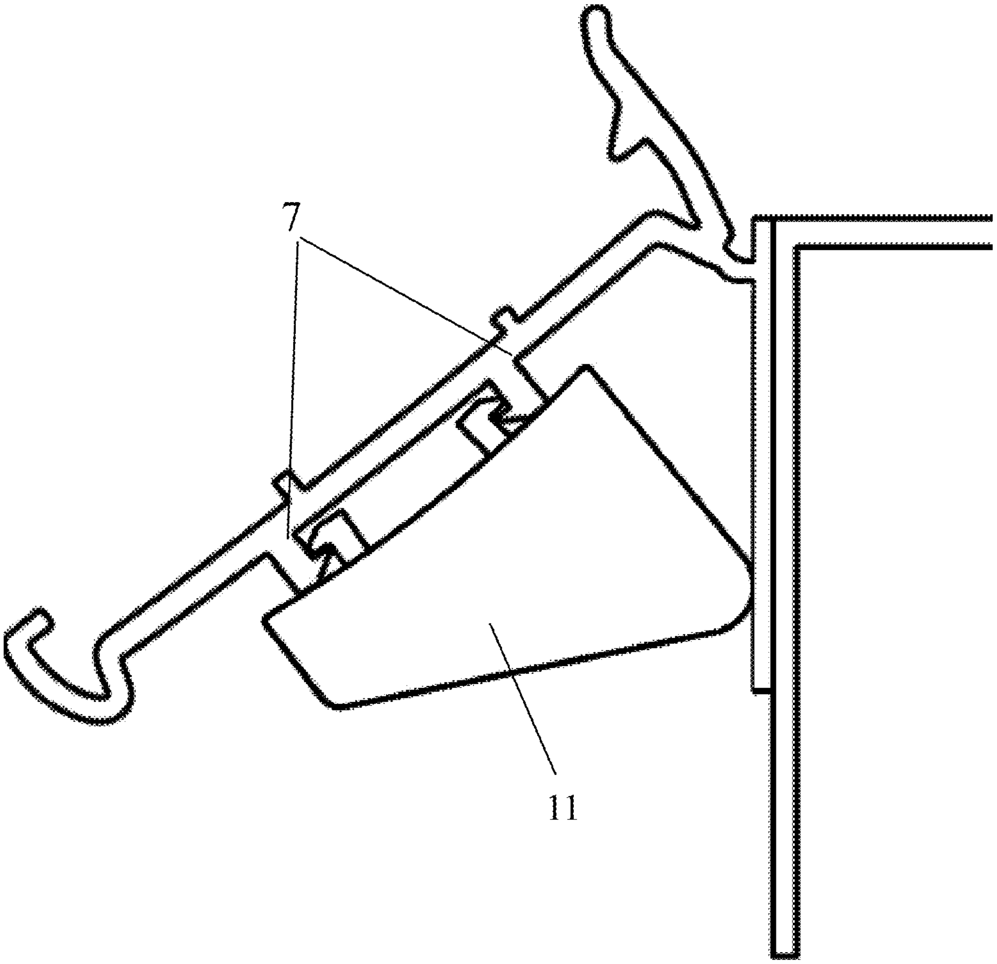
FIG. 11 illustrates a second schematic diagram of mounting of an angle block according to an embodiment of the present disclosure.
Figure 12:
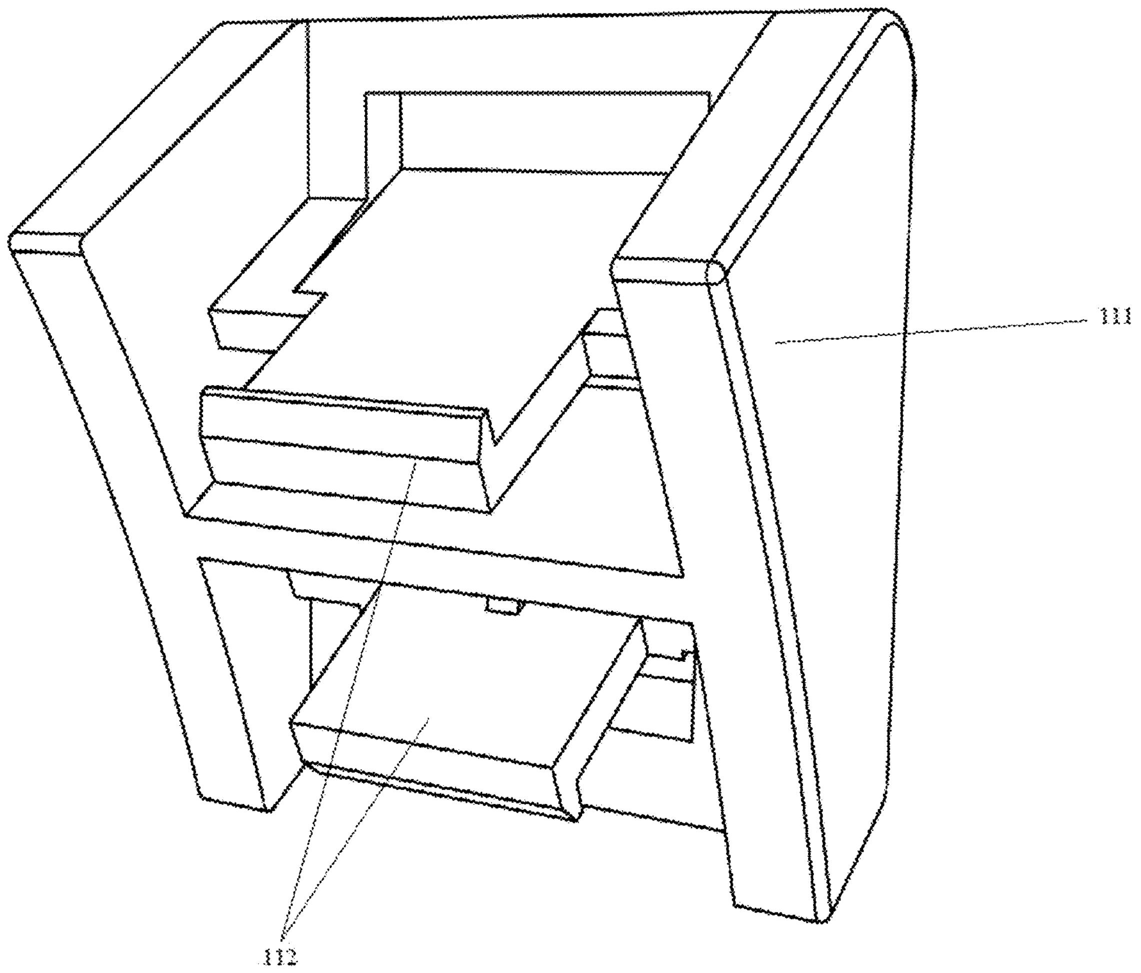
FIG. 12 illustrates a schematic diagram of a front-viewing structure of an angle block according to an embodiment of the present disclosure.
Figure 13:
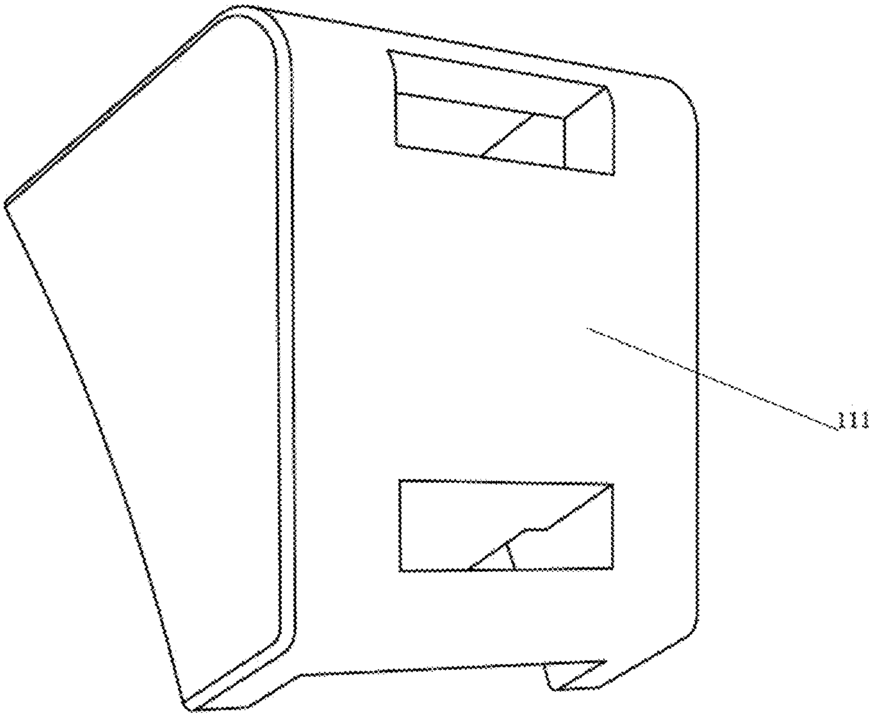
FIG. 13 illustrates a schematic diagram of a back-viewing structure of an angle block according to an embodiment of the present disclosure.
Figure 14:
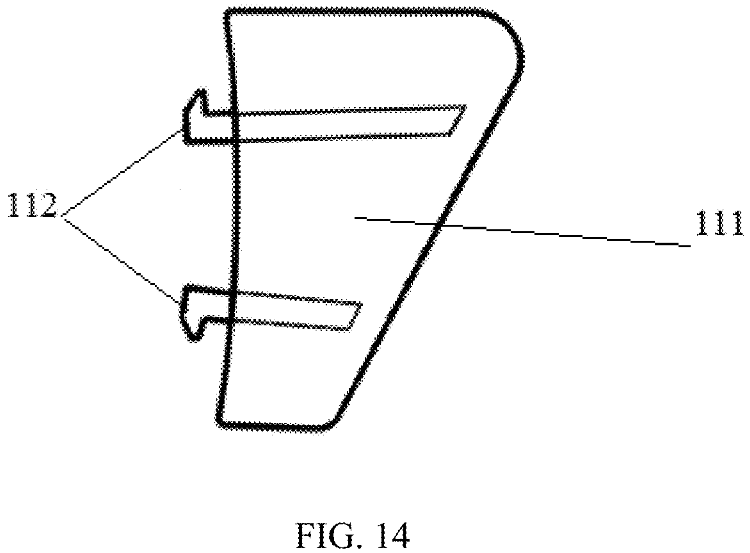
FIG. 14 illustrates a first schematic diagram of a side-viewing structure of an angle block according to an embodiment of the present disclosure.
Figure 15:
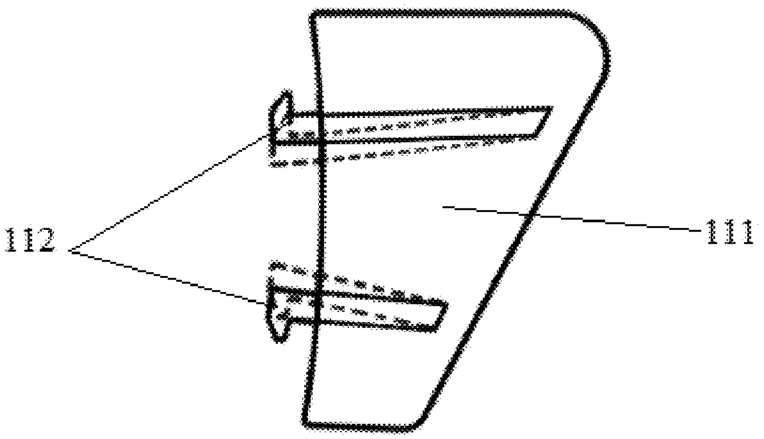
FIG. 15 illustrates a second schematic diagram of a side-viewing structure of an angle block according to an embodiment of the present disclosure.
Figure 16:
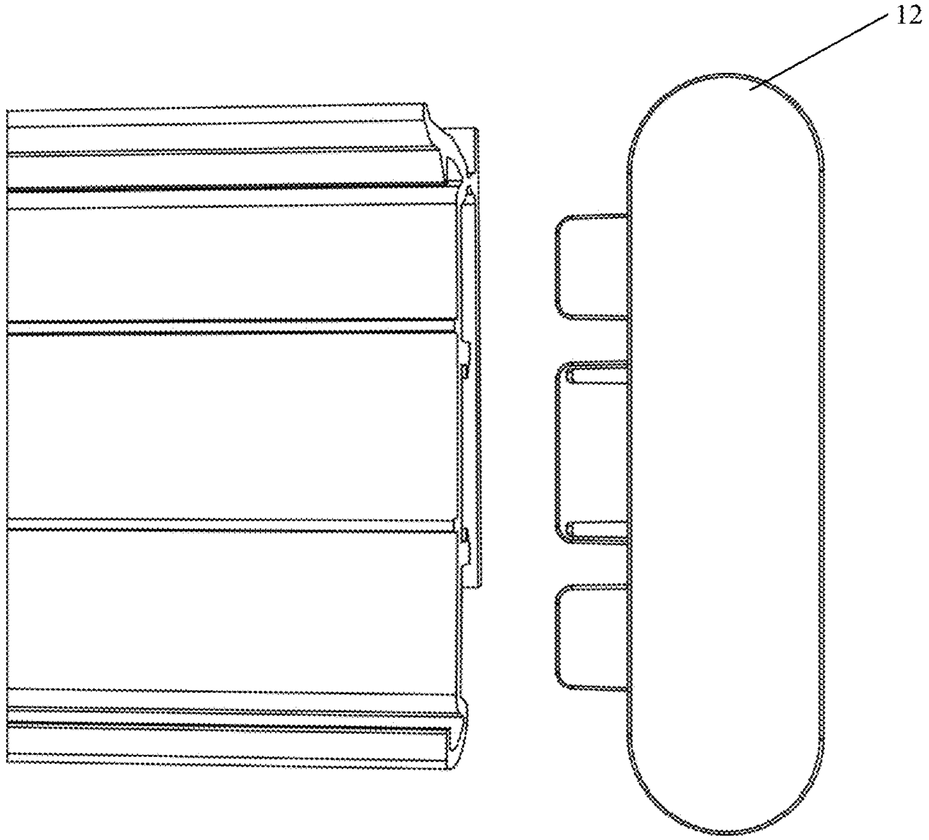
FIG. 16 illustrates a first schematic diagram of mounting of a plug according to an embodiment of the present disclosure.
Figure 17:
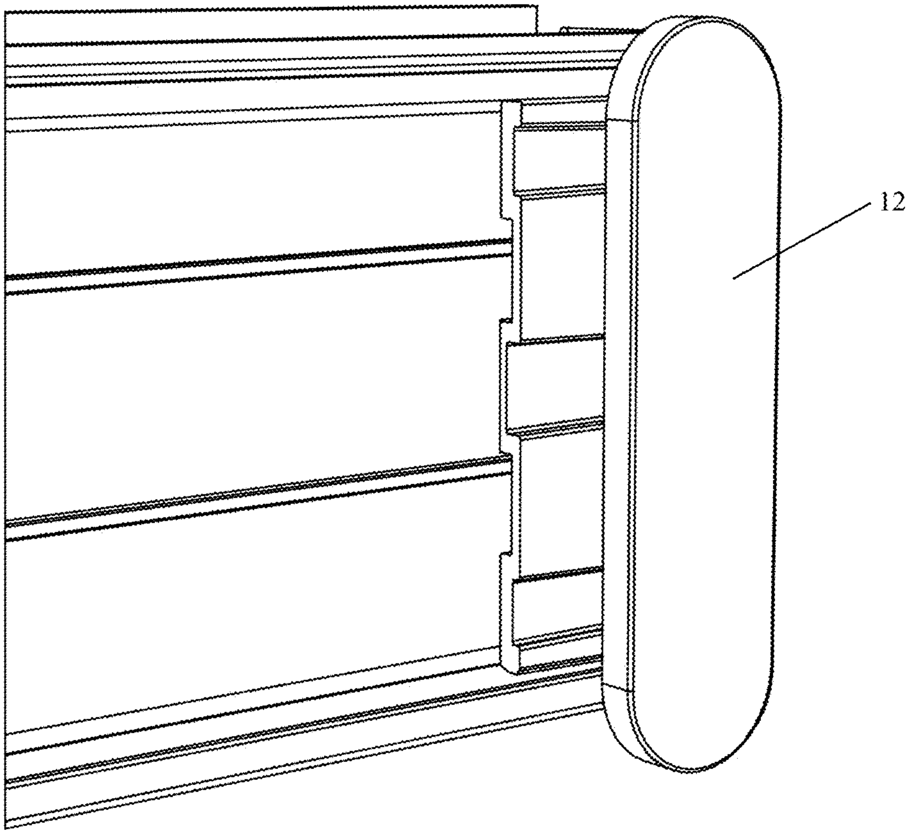
FIG. 17 illustrates a second diagram of mounting of a plug according to an embodiment of the present disclosure.
Figure 18:
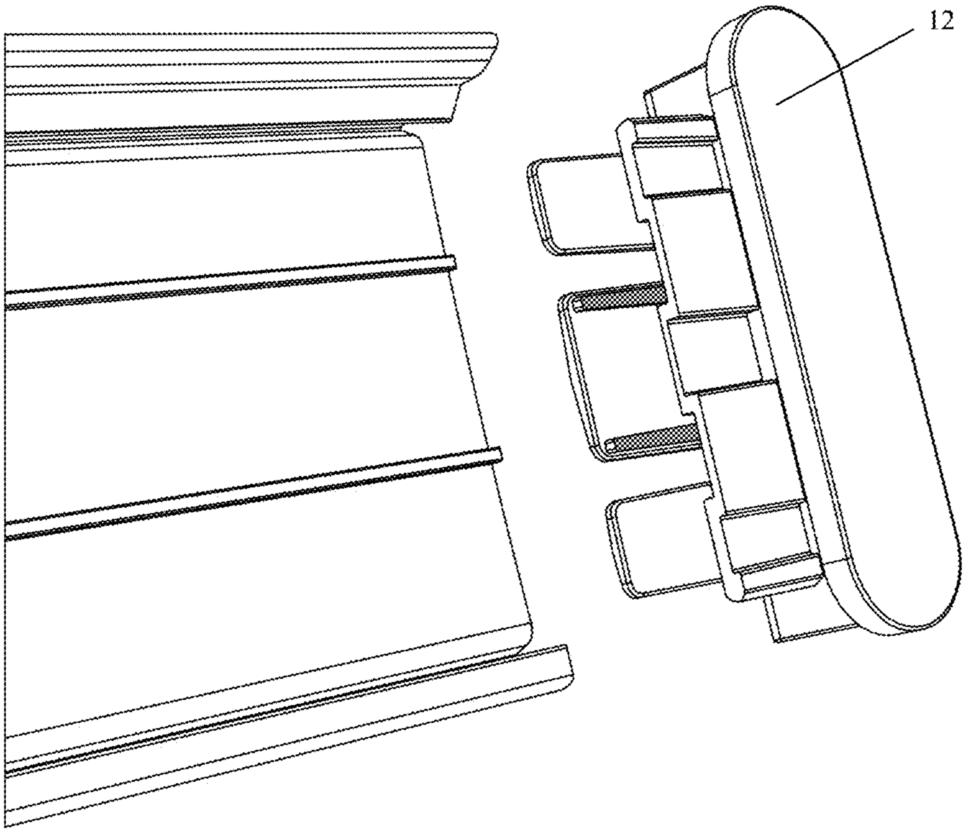
FIG. 18 illustrates a third schematic diagram of mounting of a plug according to an embodiment of the present disclosure.
Figure 19:
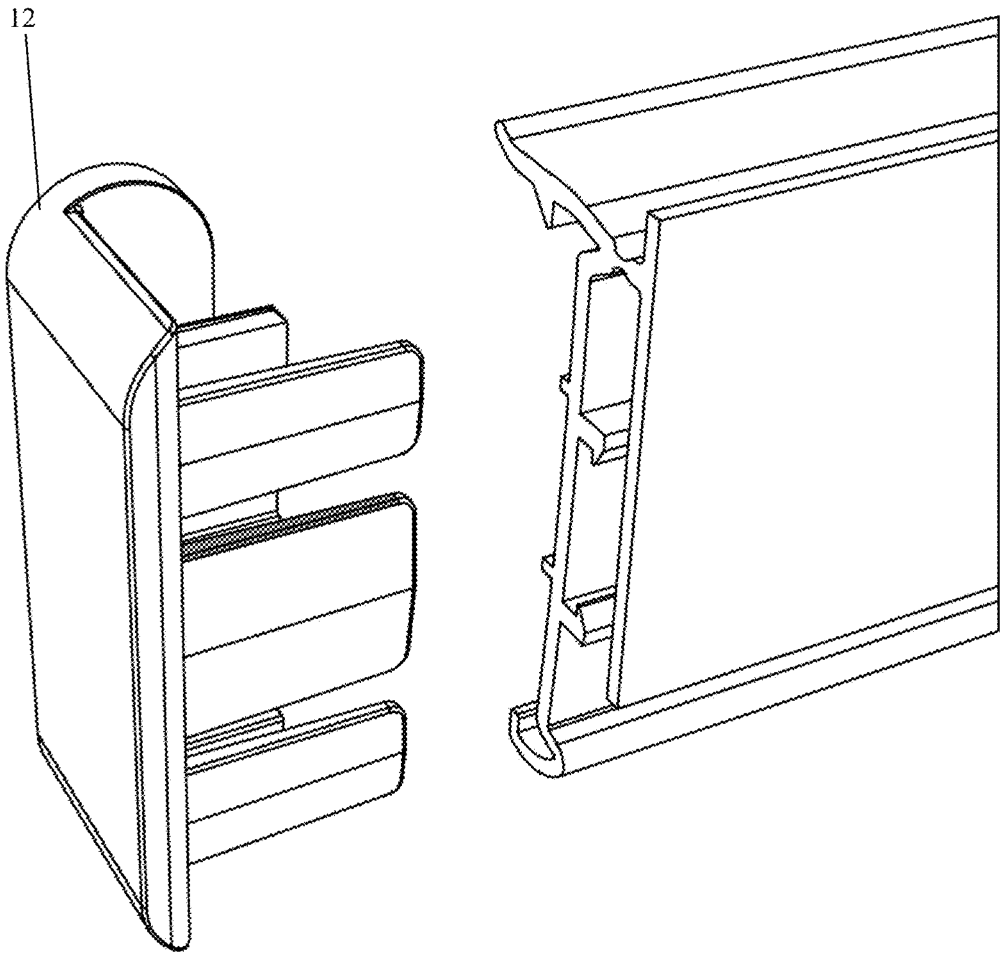
FIG. 19 illustrates a fourth structurally schematic diagram of a plug according to an embodiment of the present disclosure.
Figure 20:
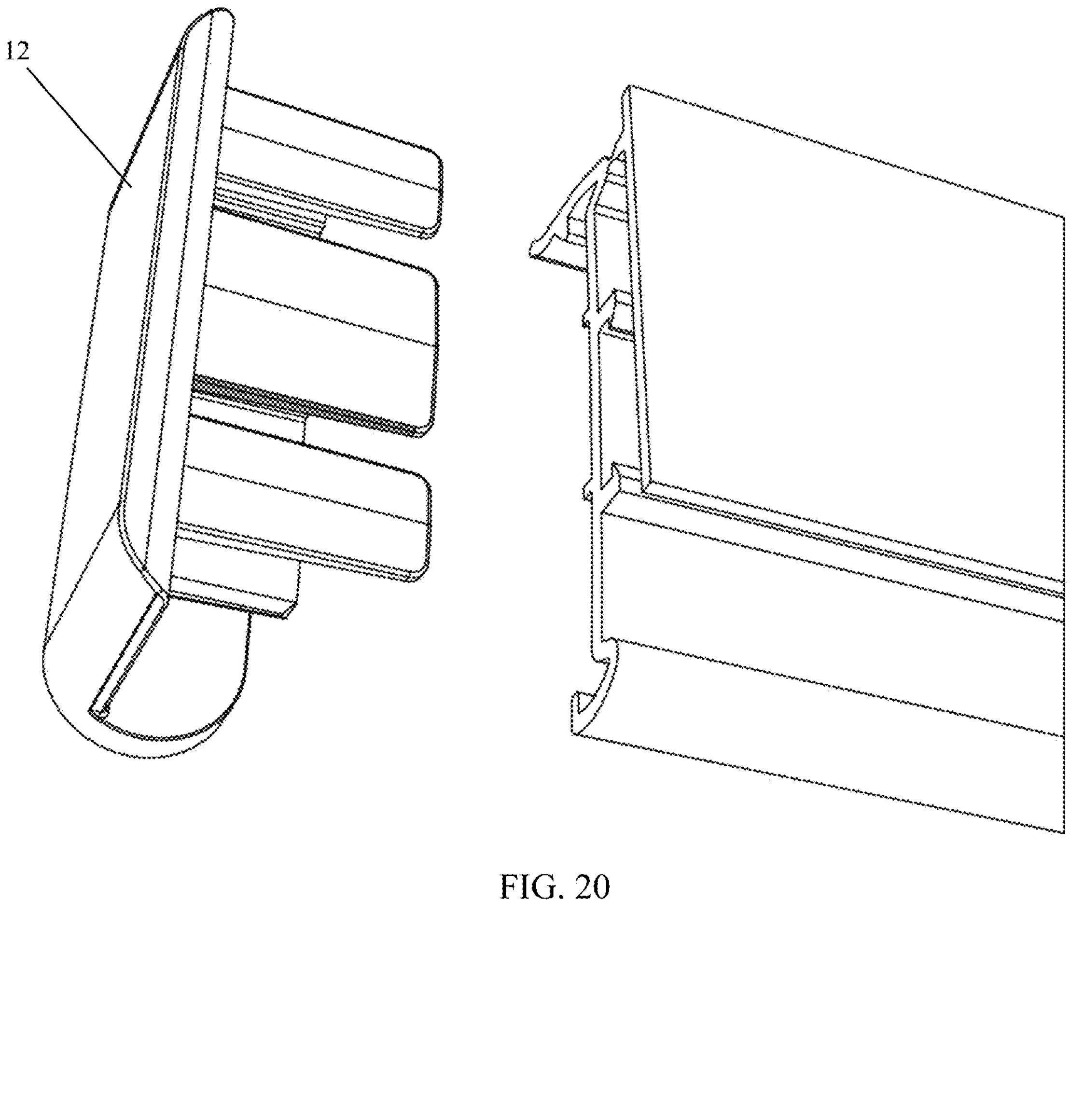
FIG. 20 illustrates a fifth structurally schematic diagram of a plug according to an embodiment of the present disclosure.

The angle block snap can be mounted with an angle block 11 that is capable of providing two angles (or other angles), as illustrated in FIGS. 10 and 11, and the bendable soft rubber provides an angle range for the guide rail to swing.

In an embodiment of the present disclosure, an angle block 11 is further included, which is mounted on the angle block snap 7 and used to adjust a lifting angle of the guide rail.

Specifically, as illustrated in FIGS. 12 to 15, the angle block 11 is designed with an angle block body 111 and two snaps 112. The two snaps 112 are respectively clamped on the angle block snaps 7, and different lifting angles of the guide rail are set by different shapes of the angle block mounted in different directions. The distance between the two snaps 112 and the angles of the two snaps 112 can be set arbitrarily.

In an embodiment of the present disclosure, plugs 12 are further included. The plugs 12 are mounted at left and right ends of the guide rail body 0, and used to protect a user from being damaged by sharp corners at the left and right ends of the guide rail body 0.

Specifically, as illustrated in FIGS. 16 to 20, the plug 12 includes a plug body 13 and two layers of positioning clamping strips 14. The two layers of positioning clamping strips 14 are used to fasten the plug by being in an interference fit with the guide rail body 0.

Description of the Plug Assembly Design:

1. horizontal direction: the plug is fastened by an interference fit between the upper and lower positioning clamping strips of the plug (FIG. 18) and the wall of the guide rail;
2. vertical direction: the plug is fastened by an interference fit between wedge surfaces on both sides of the positioning clamping strips in the middle of the bottom layer of the plug and the upper and lower snaps on the back side of the guide rail (FIGS. 19 and 20);
3. after being mounted in place, the plug can bear a drawing force more than 50 N.

Figure 21:
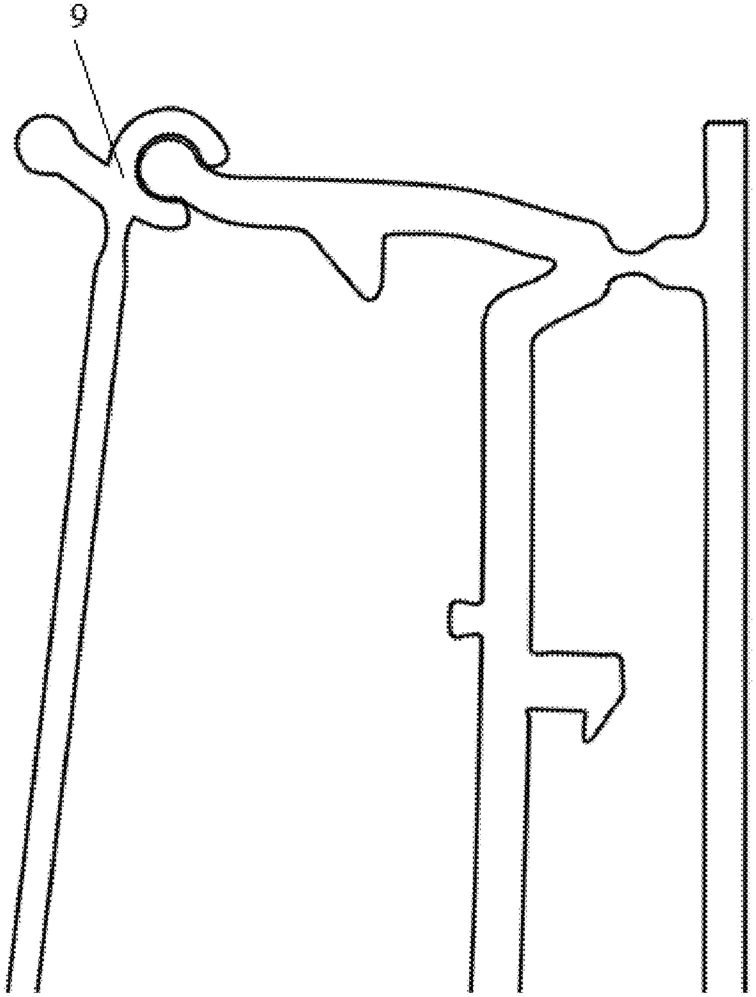
FIG. 21 illustrates a schematic diagram of mounting of an electronic-shelf-label protective cover according to an embodiment of the present disclosure.

In an embodiment of the present disclosure, as illustrated in FIG. 21, an electronic-shelf-label protective cover 9 is further provided, which is connected to the disassembly guiding arm 4 and uses to protect the electronic shelf label.

Figure 22:
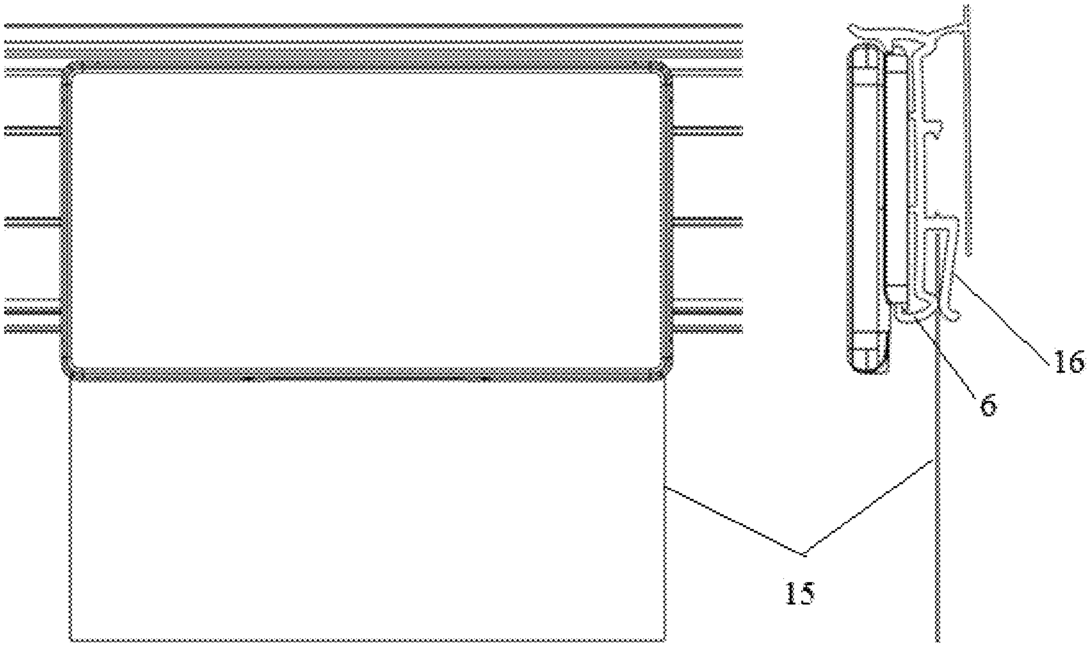
FIG. 22 illustrates a schematic diagram of mounting of a promotion card and a promotion-card elastic arm according to an embodiment of the present disclosure.

In an embodiment of the present disclosure, as illustrated in FIG. 22, a promotion-card elastic arm 16 is further included, which is located on a side of the guide rail body 0 facing away from the electronic shelf label, and a promotion card 15 that is customized is inserted and mounted between the promotion-card elastic arm 16 and the anti-disassembly-damage elastic arm 6 by interference force.

Figure 23:
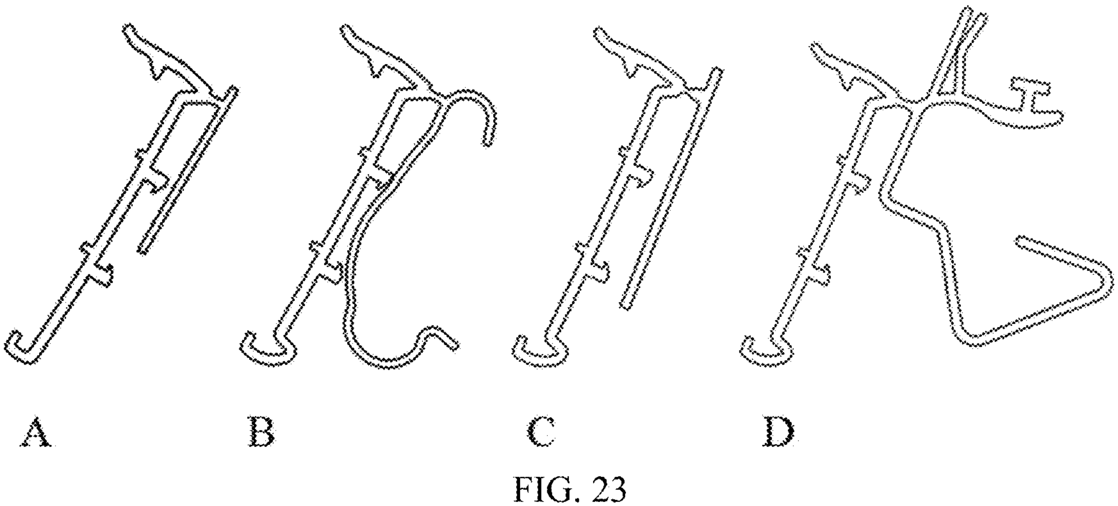
FIG. 23 illustrates a schematic diagram of guide rails with different back card types according to an embodiment of the present disclosure.

In an embodiment of the present disclosure, as illustrated in FIG. 23, the present disclosure includes but is not limited to these guide rails with different types of back cards. In FIG. 23, a back card of type A is suitable to be adhered to a shelf by glue, a back card of type B is suitable to be externally clamped on a shelf having a matched width, a back card of type C is suitable to be internally clamped on a shelf having a matched bayonet, and a back card of type D is suitable to be externally and horizontally clamped on a shelf having a matched width.

The guide rail for installing an ultra-thin EPD electronic shelf label proposed by the present disclosure has the following advantageous effects:

1) the designs of the snaps, the guiding arm and the snap elastic arm are capable of being mounted with and protecting the electronic shelf label, while facilitating the installation and disassembly and preventing disassembly-damage;
2) the anti-slip soft rubber generates a resistance to the sliding of the electronic shelf label on the guide rail, so as to ensure that the position of the electronic shelf label on the guide rail will not be easily changed;
3) the design of the bendable soft rubber facilitates the guide rail to be lifted up;
4) the design of the angle block snap can be effectively mounted with the angle block;
5) when being forcibly dismantled from the bottom of the guide rail by mistake, the electronic shelf label can be effectively protected by the anti-disassembly-damage elastic arm;
6) the ends of the guide rail may be mounted with plugs to protect a user from being damaged by the sharp corners of the ends.
7) the electronic-shelf-label protective cover can protect the electronic shelf label; and
8) the promotion card can be freely mounted at any position on the guide rail to display the promotion information.

The above specific embodiments further explain the objectives, technical solutions and advantageous effects of the present disclosure in detail. As should be understood, those described above are merely specific embodiments of the present disclosure, and are not intended to limit the protection scope of the present disclosure. Any modification, equivalent substitution, improvement, etc. made within the spirit and principle of the present disclosure should be included in the protection scope of the present disclosure.

The invention claimed is:

1. A guide rail for installing an ultra-thin EPD electronic shelf label, comprising a guide rail body, an upper snap, a lower snap, an upper elastic arm, a lower elastic arm and a mounting pendant;

wherein the guide rail body is arranged along a longitudinal direction, upper and lower ends of the guide rail body are integrally connected to the upper elastic arm and the lower elastic arm, respectively; the upper snap is located on the upper elastic arm, and the lower snap is integrally connected to the lower elastic arm;

the upper snap and the lower snap are located on a first side of the guide rail body for clamping the electronic shelf label on the first side of the guide rail; and the mounting pendant is disposed on a second side of the guide rail body facing away from the electronic shelf label;

wherein the lower elastic arm comprises a first lower-elastic-arm segment and a second lower-elastic-arm segment;

the first lower-elastic-arm segment is located on the second side of guide rail body, with one end connected to the lower end of the guide rail body;

one end of the second lower-elastic-arm segment is located on the second side of the guide rail body and connected to the other end of the first lower-elastic-arm segment;

the other end of the second lower-elastic-arm segment is located on the first side of the guide rail body and connected to the lower snap; and the second lower-elastic-arm segment is spaced apart from the lower end of the guide rail body in the longitudinal direction;

wherein the one end of the second lower-elastic-arm segment and the other end of the first lower-elastic-arm segment are connected each other to form a V-shaped structure.

2. The guide rail for installing an ultra-thin EPD electronic shelf label according to claim 1, wherein an end of the upper elastic arm away from the guide rail body forms a disassembly guiding arm.

3. The guide rail for installing an ultra-thin EPD electronic shelf label according to claim 2, further comprising an electronic-shelf-label protective cover connected to the disassembly guiding arm and used to protect the electronic shelf label.

4. The guide rail for installing an ultra-thin EPD electronic shelf label according to claim 1, wherein a connection between the upper elastic arm and the mounting pendant is made of a bendable soft rubber.

5. The guide rail for installing an ultra-thin EPD electronic shelf label according to claim 1, further comprising two first snaps mounted on a side wall of the second side of the guide rail body facing away from the electronic shelf label, wherein the two first snaps are spaced apart along the longitudinal direction.

6. The guide rail for installing an ultra-thin EPD electronic shelf label according to claim 5, further comprising an angle block for being mounted on the two first snaps and adjusting the lifting angle of the guide rail.

7. The guide rail for installing an ultra-thin EPD electronic shelf label according to claim 6, wherein the angle block comprises an angle block body and two second snaps, the two second snaps are respectively clamped on the two first snaps, and the lifting angle of the guide rail is adjusted by a shape of the angle block body.

8. The guide rail for installing an ultra-thin EPD electronic shelf label according to claim 5, further comprising plugs mounted at left and right ends of the guide rail body.

9. The guide rail for installing an ultra-thin EPD electronic shelf label according to claim 8, wherein each of the plugs comprises a plug body and two layers of positioning clamping strips, and the two layers of positioning clamping strips are used to fasten the plug by being in an interference fit with the guide rail body.

10. The guide rail for installing an ultra-thin EPD electronic shelf label according to claim 1, further comprising a third elastic arm located on the second side of the guide rail body for holding a promotion card, wherein the third elastic arm extends along the longitudinal direction to the lower elastic arm and abuts against a junction between the first lower-elastic-arm segment and the second lower-elastic-arm segment.

11. The guide rail for installing an ultra-thin EPD electronic shelf label according to claim 1, wherein the V-shaped structure of the lower elastic arm is located between the guide rail body and the mounting pendant.

12. The guide rail for installing an ultra-thin EPD electronic shelf label according to claim 1, wherein the second lower-elastic-arm segment is an arc-shaped segment.

13. The guide rail for installing an ultra-thin EPD electronic shelf label according to claim 1, wherein an angle between the first lower-elastic-arm segment and the guide rail body is an obtuse angle.

14. The guide rail for installing an ultra-thin EPD electronic shelf label according to claim 1, wherein a lower insertion opening, which allows the electronic shelf label to be inserted, is located on the first side between the lower snap and the guide rail body;

the lower elastic arm and the lower snap together define a lower expandable slot that is in communication with the lower insertion opening, and the lower expandable slot spans both the first and second sides of the guide rail body.

15. The guide rail for installing an ultra-thin EPD electronic shelf label according to claim 1, wherein the upper elastic arm comprises a first upper-elastic-arm segment and a second upper-elastic-arm segment, the first upper-elastic-arm segment is located on the second side of guide rail body, with one end connected to the upper end of the guide rail body, one end of the second upper-elastic-arm segment is located on the second side of the guide rail body and connected to the other end of the first upper-elastic-arm segment, the other end of the second upper-elastic-arm segment is located on the first side of the guide rail body and connected to the upper snap, and the second upper-elastic-arm segment is spaced apart from the upper end of the guide rail body in the longitudinal direction.

16. The guide rail for installing an ultra-thin EPD electronic shelf label according to claim 15, wherein the one end of the second upper-elastic-arm segment and the other end of the first upper-elastic-arm segment are connected to each other to form a V-shaped structure.

17. The guide rail for installing an ultra-thin EPD electronic shelf label according to claim 16, wherein the V-shaped structure of the upper elastic arm is located between the guide rail body and the mounting pendant.

18. The guide rail for installing an ultra-thin EPD electronic shelf label according to claim 15, wherein an angle between the first upper-elastic-arm segment and the guide rail body is an obtuse angle.

19. The guide rail for installing an ultra-thin EPD electronic shelf label according to claim 15, wherein an upper insertion opening, which allows the electronic shelf label to be inserted, is located on the first side between the upper snap and the guide rail body;

the upper elastic arm and the upper snap together define an upper expandable slot that is in communication with the upper insertion opening, and the upper expandable slot spans both the first and second sides of the guide rail body.

* * * * *